United States Patent
Kellam et al.

(10) Patent No.: US 12,149,289 B2
(45) Date of Patent: Nov. 19, 2024

(54) SYSTEMS AND METHODS FOR BIDIRECTIONAL POLARIZATION SIGNALING

(71) Applicant: Rambus Inc., San Jose, CA (US)

(72) Inventors: Mark D. Kellam, Siler City, NC (US); Carl W. Werner, Los Gatos, CA (US)

(73) Assignee: Rambus Inc., San Jose, CA (US)

( * ) Notice: Subject to any disclaimer, the term of this patent is extended or adjusted under 35 U.S.C. 154(b) by 103 days.

(21) Appl. No.: 17/967,029

(22) Filed: Oct. 17, 2022

(65) Prior Publication Data
US 2023/0139848 A1    May 4, 2023

Related U.S. Application Data

(60) Provisional application No. 63/274,751, filed on Nov. 2, 2021.

(51) Int. Cl.
| | | |
|---|---|---|
| H04J 14/06 | (2006.01) | |
| H04B 10/40 | (2013.01) | |
| H04B 10/532 | (2013.01) | |

(52) U.S. Cl.
CPC .......... H04B 10/40 (2013.01); H04B 10/532 (2013.01)

(58) Field of Classification Search
CPC ....................................................... H04J 14/06
See application file for complete search history.

(56) References Cited

U.S. PATENT DOCUMENTS

| | | |
|---|---|---|
| 7,054,519 B1 | 5/2006 | Novotny |
| 7,058,253 B1 | 6/2006 | Novotny |
| 9,874,697 B1* | 1/2018 | Goi ...................... G02B 6/2766 |
| 2014/0314406 A1 | 10/2014 | Zerbe et al. |
| 2019/0007091 A1* | 1/2019 | Graceffo ................ H04B 10/40 |

FOREIGN PATENT DOCUMENTS

EP      0637762 B1     5/2000

OTHER PUBLICATIONS

Cao et al., "Adiabatic Couplers in SOI Waveguides," DOI: 10.1364/CLEO.2010.CThAA2, May 2010 (3 pages).
Chung et al. "Asymmetric adiabatic couplers for fully-integrated broadband quantum-polarization state preparation," Scientific Reports 7:16841, Dec. 4, 2017 (7 pages).
Gerard et al., "Fast and Uniform Optically-Switched Data Centre Networks Enabled by Amplitude Caching," 2021 Optical Fiber Communications Conference and Exhibition (OFC), 2021, pp. 1-3 (3 pages).
Li et al., "Efficient Polarization Beam Splitter Based on All-Dielectric Metasurface in Visible Region," Nanoscale Research Letters (2019) 14:34, 7 pages.

(Continued)

*Primary Examiner* — Shi K Li
(74) *Attorney, Agent, or Firm* — Silicon Edge Law Group LLP; Arthur J. Behiel

(57) ABSTRACT

A photonic communication system in which a host communicates bidirectionally with a target via a single optical fiber using light of the same wavelength and from the same light source. Signals flowing in opposite directions are discriminated based on polarity. Using the same fiber and light source in both directions reduces cost, complexity, and power consumption.

20 Claims, 1 Drawing Sheet

(56) References Cited

OTHER PUBLICATIONS

Sacher et al., "Polarization rotator-splitters in standard active silicon photonics platforms," Opt Express. Feb. 24, 2014;22(4):3777-86. doi: 10.1364/OE.22.003777, 10 pages.
Tarhuni, "State-of-polarization encoding for optical code-division multiple-access networks," J. of Electromagn. Waves and Appl., vol. 21, No. 10, 2007 (11 pages).
Wikipedia, "Optical ring resonators," https://en.wikipedia.org/w/index.php?title=Optical_ring_resonators&oldid=1042230983, last edited on Sep. 3, 2021, at 21:31 (UTC), 8 pages.
Wikipedia, "Polarization rotator," https://en.wikipedia.org/w/index.php?title=Polarization_rotator&oldid=1015256039, last edited on Mar. 31, 2021, at 13:27 (UTC), 2 pages.
Wikipedia, "Polarization-division multiplexing," https://en.wikipedia.org/w/index.php?title=Polarization-division_multiplexing&oldid=1050397302, last edited on Oct. 17, 2021, at 15:37 (UTC), 4 pages.
Wikipedia, "Precision Time Protocol," https://en.wikipedia.org/w/index.php?title=Precision_Time_Protocol&oldid=1043528734, last edited on Sep. 10, 2021, at 15:10 (UTC), 10 pages.
Wikipedia, "Prism rotators," https://en.wikipedia.org/w/index.php?title=Polarization_rotator&oldid=1015256039, last edited on Mar. 31, 2021, at 13:27 (UTC), 2 pages.
Wikipedia, "Silicon photonics," https://en.wikipedia.org/w/index.php?title=Silicon_photonics&oldid=1042590633, last edited on Sep. 5, 2021, at 19:28 (UTC), 15 pages.
Wikipedia, "Wavelength-division multiplexing," https://en.wikipedia.org/w/index.php?title=Wavelength-division_multiplexing&oldid=1047471825, last edited on Oct. 1, 2021, at 01:16 (UTC) 10 pages.
Zafar et al., "High-extinction ratio polarization splitter based on an asymmetric directional coupler and on-chip polarizers on a silicon photonics platform," Optics Express 22899 vol. 28, No. 15, Jul. 20, 2020, 9 pages.
Zetie et al. "How does a Mach-Zehnder interferometer work?," Phys. Educ. 35(1) Jan. 2000 (3 pages).
Zheng et al., "A high-speed, tunable silicon photonic ring modulator integrated with ultra-efficient active wavelength control," Optics Express 12628, vol. 22, No. 10, May 16, 2014, 6 pages.

\* cited by examiner

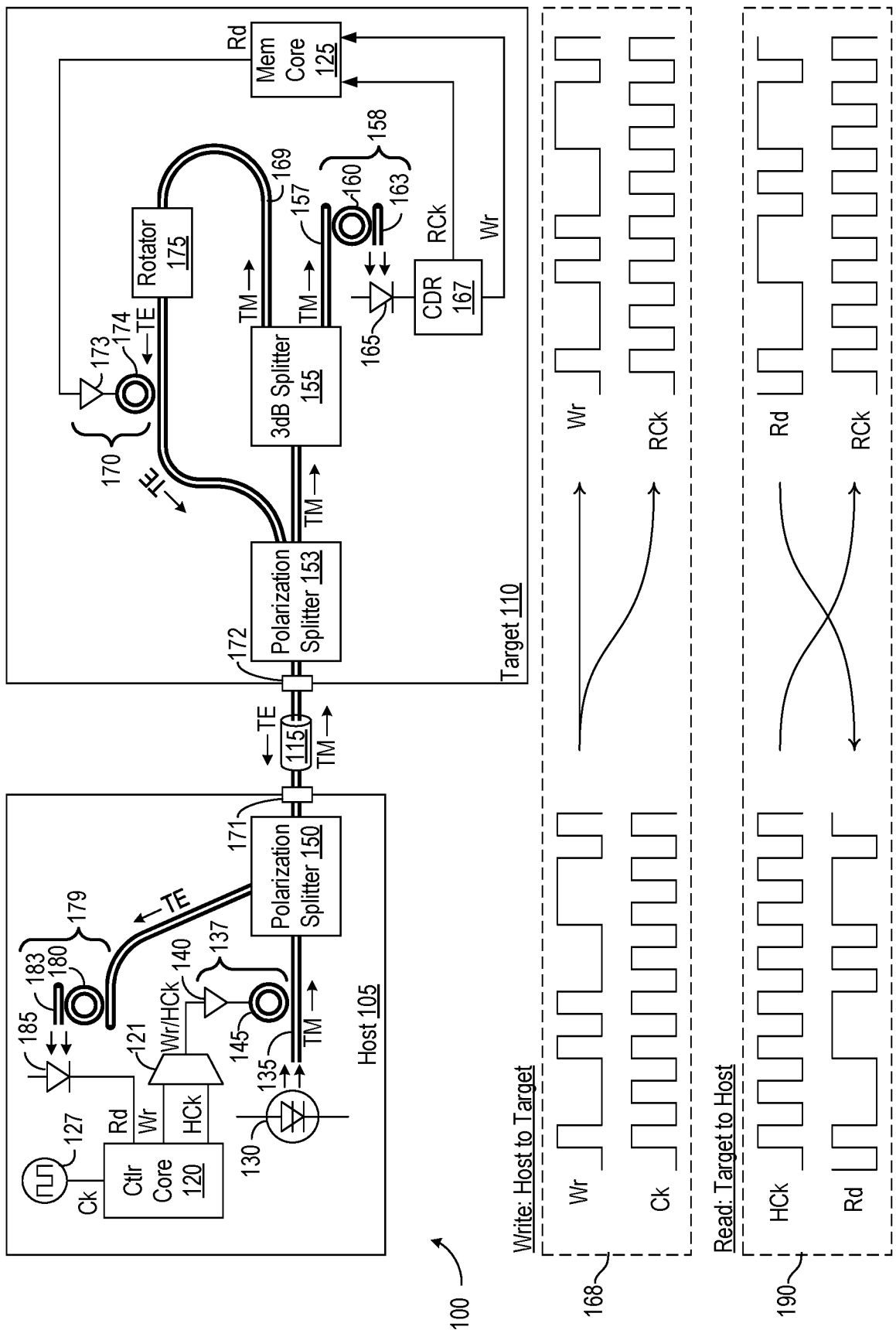

SYSTEMS AND METHODS FOR BIDIRECTIONAL POLARIZATION SIGNALING

TECHNICAL FIELD

The subject matter presented herein relates generally to methods and systems for conveying and receiving data through optical signals.

BACKGROUND

Light propagates through optical fibers with little attenuation and supports high-bandwidth communication. Photonic signals—modulated beams of light—do not interfere with one another so a single fiber can carry many independent optical signals in the same or opposite directions.

Photonic signals conveyed together are generally distinguished by wavelength (color). To produce a photonic signal, a beam from a laser made to issue light of a specific wavelength is modulated to impress information on the beam. Many such signals, each of a different wavelength, can be injected concurrently into the same fiber to be later separated by wavelength at their respective destinations. The information impressed on each beam can then be recovered by demodulation. In similar fashion, information may be independently encoded onto multiple polarization modes of a single fiber, subsequently separating them to recover the disparate information.

Combining signals of different wavelengths into a single channel, and subsequently separating them to recover the disparate information, is commonly referred to as wavelength-division multiplexing (WDM). WDM enables bidirectional communications over a single strand of fiber, also called wavelength-division duplexing, as well as multiplication of capacity. Each signal requires a laser of a corresponding wavelength, however, and lasers are difficult to integrate and relatively expensive.

BRIEF DESCRIPTION OF THE FIGURES

FIG. 1 depicts a photonic communication system 100 in which a host 105 and target 110 communicate bidirectionally over a single waveguide 115 using light of the same wavelength and from the same light source.

The illustrations are by way of example, and not by way of limitation. Like reference numerals similar elements.

DETAILED DESCRIPTION

FIG. 1 depicts a photonic communication system 100 in which a host 105 and target 110 communicate bidirectionally over a single waveguide 115 (e.g. an optical fiber) using light of the same wavelength and from the same light source. Using the same fiber and light source in both directions reduces cost, complexity, and power consumption.

For this illustration, host 105 is assumed to be a photonic transceiver (transmitter/receiver) within or in support of a memory controller and target 110 a photonic transceiver within or in support of a memory. Host 105 includes some controller core 120 controlling a multiplexer 121 that sends write data Wr or host clock HCk to target 110 via waveguide 115, either selection timed to a local clock Ck from an oscillator 127 that serves as a reference for both host 105 and target 110. Write data Wr is for storage in a memory core 125, while host clock HCk communicates timing to target 110 for synchronizing the receipt of read data Rd from memory core 125. All write, read, and timing signals are conveyed via the same waveguide 115. Host 105 also conveys memory commands and addresses over the same fiber, but memory messaging is well known to those of skill in the art, so a detailed discussion is omitted.

Host 105 includes a laser 130 that delivers light of a desired bandwidth and polarization into an optical waveguide 135 (e.g., a silicon waveguide or optical fiber). The light consists of electric and magnetic fields that oscillate perpendicular to one another. By convention, "polarization" refers to the direction in which the electric field oscillates. Polarized waves can be transverse, meaning that the direction of oscillation is transverse to the direction of wave propagation. The light from laser 130 is polarized in the transverse magnetic (TM) mode, which is to say that the magnetic field is parallel to the plane of the substrate. Light can also be polarized in the transverse electric (TE) mode in which the electric field is parallel to the plane of the substrate. In silicon photonics, the substrate typically comprises a silicon wafer with waveguides formed using silicon oxide cladding and monocrystalline silicon cores. TM or TE polarized light can be obtained by reflection, refraction, birefringence, and selective absorption.

The TM-polarized light in waveguide 135 is conveyed to a transmitter 137, an optical modulator that includes an electronic signal driver 140 and associated photonic ring 145, a circular waveguide. Light entering waveguide 135 exhibits a range of wavelengths, or spectrum. Some of that light couples into adjacent ring 145 via the small space separating the two waveguides via a process known as evanescent coupling. Ring 145 has an optical wavelength that is an integer multiple of some wavelengths within the spectrum of the beam traveling through waveguide 135. These wavelengths couple more efficiently into ring 145 and are thus removed from the beam to leave a pattern of relatively dark notches at wavelengths that are a function of ring 145. Write data Wr from controller core 120 is expressed as patterns of electrical signals that stimulate ring 145 to vary the notch wavelengths and thus modulate the light passing through waveguide 135. Light exiting waveguide 135 will therefore exhibit relatively dim notches, the wavelengths of which change responsive to write data Wr. (By analogy, one might imagine sending a signal by shining a rainbow of light and periodically darkening either the red or blue light in a recognizable pattern.) Other forms of modulators (e.g., Mach-Zehnder modulators) and modulation schemes can be used. Host 105 can include additional transmitters 137 to support multiple propagation modes through waveguide 115.

The modulated, TM-mode light from waveguide 135 enters a polarization splitter 150, an optical element that divides polarized light into TM and TE modes. There being little to no TE-mode component of the modulated beam, splitter 150 simply forwards the TM-mode light from host 105 to target 110 via waveguide 115, a polarization-maintaining fiber that maintains the TM mode to a polarization splitter 153 at target 110. Host 105 and target 110 have respective optical ports 171 and 172 that are keyed to maintain the physical orientation of waveguide 115 relative to the orientations of polarizations of splitters 150 and 153. Polarization splitter 153 passes the modulated TM-mode beam to a 3 dB splitter 155, which divides the beam into a pair of identical modulated TM-mode beams on waveguides 157 and 169.

Waveguide 157 conveys the TM-mode beam to an optical receiver 158, a demodulator that includes a photonic ring 160 of an optical length and consequent resonant wavelengths matched to the notches induced by transmitter 137. The modulation at the transmitter changes the notch wavelengths so that they couple more or less well with ring 160. Light from ring 160 thus varies in intensity as a function of the information (e.g. write data Wr) used to modulate the transmitted beam. A waveguide 163 conveys the fluctuating beam from ring 160 to an opto-electric sensor 165 (e.g. a photodiode), which converts light intensity into an electrical signal. In other embodiments optical receiver 158 is simplified by omission of ring 160 and waveguide 163. Intensity fluctuations are instead monitored from waveguide 157. Photonic rings of different optical lengths are more often used in sets to distinguish between wavelengths in WDM systems. System 100 is shown with a single ring-based receiver for ease of illustration.

The electrical signal is fed to a clock-and-data recovery circuit (CDR) 167 that, as the name implies, recovers a clock signal RCk and the original write-data signal Wr from the output of sensor 165. CDRs are well known circuits so a detailed discussion is omitted.

Clock signal RCk and write-data signal Wr are conveyed to memory core 125, the clock signal timing memory-core operations, such as the arrival, sampling, and storing of write data and related command and address signals. This illustration is a simplification, as timing can be different in frequency and phase across different functional areas of a circuit or system.

A waveform diagram 168 illustrates how a write-data signal Wr is conveyed from host 105 to target 110. The waveforms are depicted as idealized non-return-to-zero (NRZ) signals, NRZ being a binary code in which logical ones are represented by a relatively high intensity over a symbol period and logical zeroes a relatively low intensity for the symbol period, with no other neutral or rest condition. Controller core 120 at host 105 conveys write data Wr timed to reference clock signal Ck. Transmitter 137 impresses the write-data signal onto a TM-mode carrier beam passing though waveguide 135. The modulated beam is conveyed to receiver 158, as noted previously, where CDR 167 recovers clock signal RCk and the write data pattern as write data Wr. CDR 167 passes write data Wr to memory core 125, which stores write data in time with recovered clock signal RCk to complete a write transaction for system 100.

Read transactions move read data Rd from target 110 to host 105 using a modulated beam. Target 110 lacks a light source, however, instead relying on host 105 for both light and timing for the conveyance of the read signal. Controller core 120 and multiplexer 121 in host 105 issue a periodic host clock signal HCk in lieu of write data to modulate the H-mode beam in waveguide 135. At the target side, CDR 167 recovers clock signal RCk from the periodically modulated T-mode beam for timing the read operation with core 125. Memory core 125, responsive to a read command, ignores recovered data signal Wr and instead presents the requested read data Rd to a modulator 170 that includes an electronic signal driver 173 and associated photonic ring 174.

As noted previously, 3 db splitter 155 produces two similar beams. The TM-mode beam modulated with host-clock signal HCk is conveyed to a polarization rotator 175 that changes the TM-mode polarization to TE-mode polarization. A TE-mode beam therefore passes and is modulated by ring 174 to incorporate read data Rd, the read modulation appearing as present and missing pulses in the modulated beam from the host. Ring 174 can be placed on either side of rotator 175, and more transmitters can be included in target 110 to support additional propagation modes through waveguide 115.

Polarization splitter 153 merges the modulated, TE-mode beam with the TM-mode beam from host 105. The TE-mode beam passes through waveguide 115. Polarization splitter 150 splits the TE-mode beam from the combined beam and conveys the resulting TE-mode beam to a receiver 179, a demodulator with a photonic ring 180 matched to ring 174 at target 110. A waveguide 183 conveys a modulated beam from ring 180 to an opto-electric sensor 185, which converts light intensity into an electrical version of read signal Rd. As noted in connection with receiver 158 of target 110, light can be detected without ring 180 and waveguide 183 in other embodiments.

Host 105 is the source of the timing signal and thus does not require a CDR to recover the timing of read signal Rd.

A waveform diagram 190 illustrates how a simplified read-data signal Rd is conveyed from target 110 to host 105. Host 105 issues a TM-mode beam modulated with host-clock signal HCk to target 110, which demodulates the signal to recover clock signal RCk. Rotator 175 rotates the periodic TM-mode beam to the TE mode, and memory core 125 with modulator 170 modulates the TE-mode beam with read-data signal Rd. The resulting modulated TE-mode passes through polarization splitter 153 and waveguide 115 to host 105. Polarization splitter 150 passes the modulated beam to receiver 179, which recovers read-data signal RD provides it to controller core 120 to complete the read transaction.

In the read direction, the TE-mode beam modulated by ring 174 had been modulated at host 105 using a timing reference (e.g. a periodic signal). The target-side modulator thus modulates an already modulated beam, in this embodiment by effectively deleting clock pulses in the polarized beam. Other embodiments use modulation schemes that support full duplex communication across waveguide 115. For example, three-level pulse-amplitude modulation (PAM3) can be used to distinguish data transmitted from host 105 from data simultaneously transmitted from target 110. Manchester coding, in which every data period has power in one half cycle, also supports full duplex communication.

System 100 communicates information bidirectionally, over the same waveguide, using a single light source. This simplification saves cost, area, and power, even more where the number of target nodes is greater than one. The identical signal paths to and from host 105 improve timing accuracy and reduce uncertainty, and the fact that the same light makes a round trip through target 110 minimizes the delay at the receiver. Using one passband for both directions reduces round-trip dispersion asymmetry and improves accuracy, though the methods can be extended to WDM (e.g., multiple bidirectional channels over a single fiber, each channel passing a TM-mode beam in one direction and a TE-mode beam in the other). For example, waveguide 135 can support multiple modulators each controlling a respective wavelength or set of wavelengths.

Photonic devices can be instantiated in silicon, and silicon-based photonic devices can be made using existing and very well-established semiconductor fabrication techniques. Electrical and photonic components of host 105 can thus be integrated on the same substrate. Specialized components, such as memory core 125 and laser 130, may be better formed using processes that are incompatible or suboptimal for other components. Host 105 and target 110 may therefore include both integrated and discrete components.

Host 105 is shown communicating with a single target 110 but can service more and different targets in other embodiments. An optical switch disposed between host 105 and target 110 can allow host 105 to establish bidirectional communication with multiple targets, each target lacking a respective light source or sources.

While the present invention has been described in connection with specific embodiments, variations of these embodiments will be obvious to those of ordinary skill in the art. Moreover, some components are shown directly connected to one another while others are shown connected via intermediate components. In each instance the method of interconnection establishes some desired electrical communication between two or more circuit nodes, or terminals. Such interconnection may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A transceiver comprising:
   an optical port to receive first modulated light of a first polarization mode;
   a polarization splitter coupled to the optical port to guide the first modulated light of the first polarization mode from the optical port and to guide second modulated light of a second polarization mode to the optical port;
   a demodulator coupled to the polarization splitter to demodulate the first modulated light from the polarization splitter;
   a polarization rotator coupled to the polarization splitter to rotate the first modulated light of the first polarization mode from the polarization splitter to the second polarization mode; and
   a modulator coupled to the polarization splitter and the polarization rotator, the modulator to modulate the first modulated light rotated to the second polarization mode, thereby forming the second modulated light of the second polarization mode.

2. The transceiver of claim 1, wherein one of the first polarization mode and the second polarization mode is a TM mode and the other of the first polarization mode and the second polarization mode is a TE mode.

3. The transceiver of claim 1, further comprising a beam splitter coupled to the polarization splitter, the polarization rotator, and the demodulator, the beam splitter to split the first modulated light of the first polarization mode to the polarization rotator and the demodulator.

4. The transceiver of claim 1, further comprising clock-recovery circuitry coupled to the demodulator to recover a clock signal from the demodulated first modulated light from the polarization splitter.

5. The transceiver of claim 4, the modulator further comprising a signal driver to remodulate the first modulated light in time with the recovered clock signal.

6. The transceiver of claim 1, wherein the demodulator recovers write data from the first modulated light, the transceiver further comprising a memory core to store the write data.

7. A method comprising:
   receiving first modulated light of a first polarization mode;
   demodulating the first modulated light to recover timing information;
   rotating the first modulated light of the first polarization mode to a second polarization mode to form second modulated light of the second polarization mode; and
   modulating the second modulated light of the second polarization mode.

8. The method of claim 7, the first modulated light of the first polarization mode received over a waveguide, the method further comprising and communicating the modulated second modulated light of the second polarization mode over the waveguide.

9. The method of claim 8, further comprising demodulating the modulated second modulated light of the second polarization mode.

10. The method of claim 7, further comprising recovering a timing signal from the first modulated light of the first polarization mode and timing the modulating of the second modulated light of the second polarization mode to the timing signal.

11. The method of claim 7, further comprising modulating the light of the first polarization mode.

12. The method of claim 11, further comprising generating the light of the first polarization mode.

13. The method of claim 7, further comprising combining the light of the first polarization mode and the modulated second modulated light of the second polarization mode.

14. The method of claim 13, further comprising splitting the combined light of the first polarization mode from the modulated second modulated light of the second polarization mode.

15. The method of claim 14, further comprising demodulating the modulated second modulated light of the second polarization mode.

16. A transceiver comprising:
    an optical port to simultaneously transmit a timing signal of first modulated light of a first polarization mode and receive a data signal in time with the timing signal and of second modulated light of a second polarization mode;
    a polarization splitter, coupled to the optical port, to guide the first modulated light of the first polarization mode to the optical port and to guide the second modulated light of a second polarization mode from the optical port; and
    a demodulator coupled to the polarization splitter to demodulate the second modulated light from the polarization splitter to recover the data signal.

17. The transceiver of claim 16, further comprising a modulator coupled to the polarization splitter to modulate second light of the first polarization mode, thereby forming second modulated light transmitting a second data signal of the first polarization mode.

18. The transceiver of claim 17, further comprising a light source coupled to the modulator, the light source to issue the light of the first polarization mode to the modulator.

19. The transceiver of claim 16, wherein one of the first polarization mode and the second polarization mode is a TM mode and the other of the first polarization mode and the second polarization mode is a TE mode, and wherein the data signal comprises the timing signal modulated.

20. The transceiver of claim 16, wherein the demodulator comprises a photonic ring.

* * * * *